Oct. 7, 1941.    A. RONNING    2,258,302
HYDRAULIC CLUTCH
Filed March 13, 1939    2 Sheets-Sheet 1
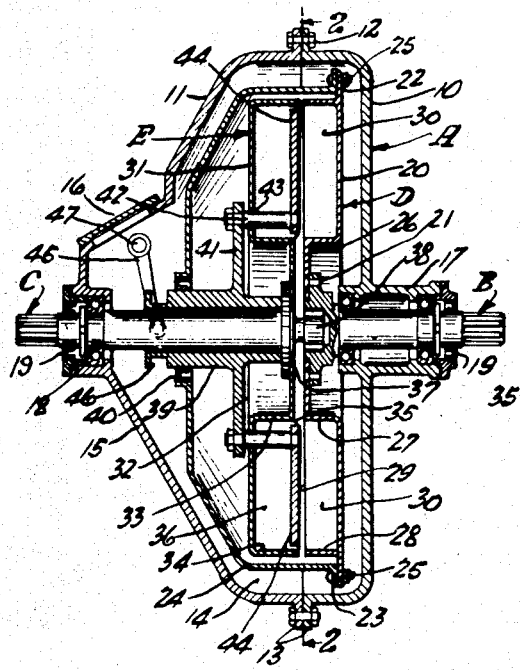
FIG-1-
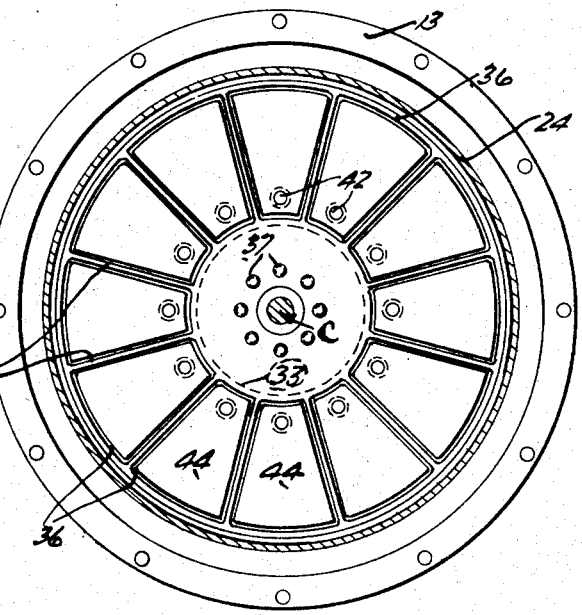
FIG-2-
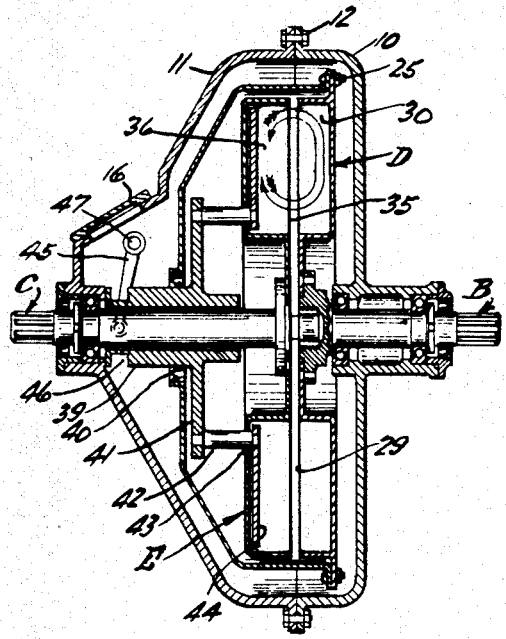
FIG-3-
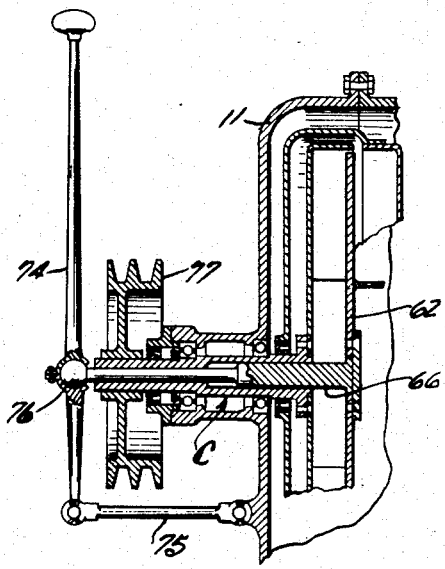
FIG-6-
INVENTOR
ADOLPH RONNING
BY Carlsen & Hayle
ATTORNEYS Oct. 7, 1941.    A. RONNING    2,258,302
HYDRAULIC CLUTCH
Filed March 13, 1939    2 Sheets-Sheet 2
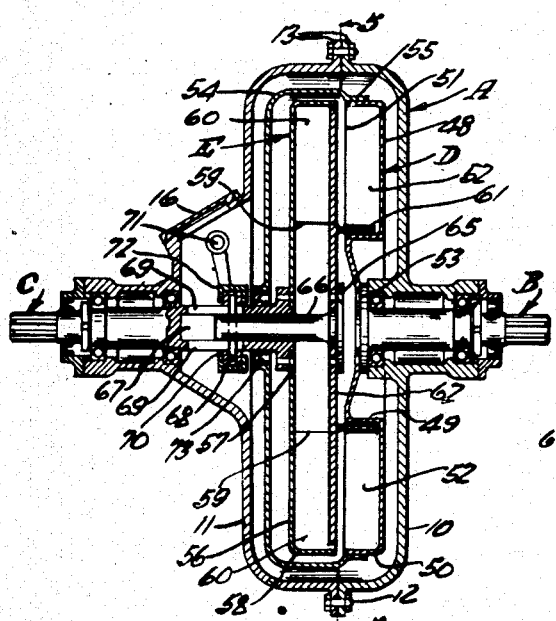
FIG-4-
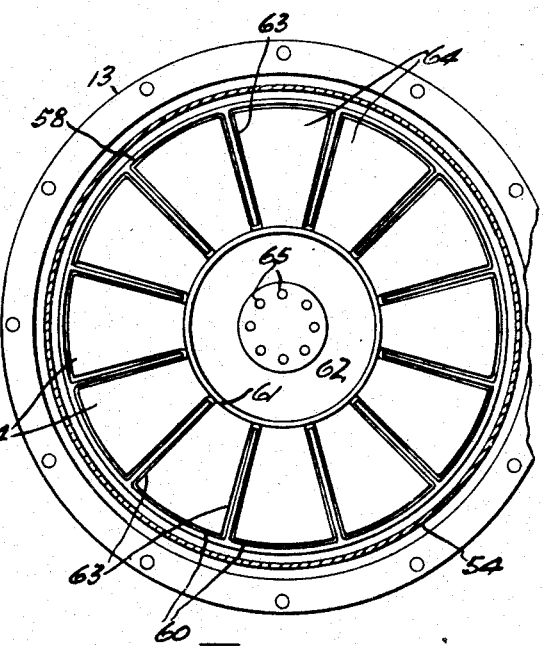
FIG-5-
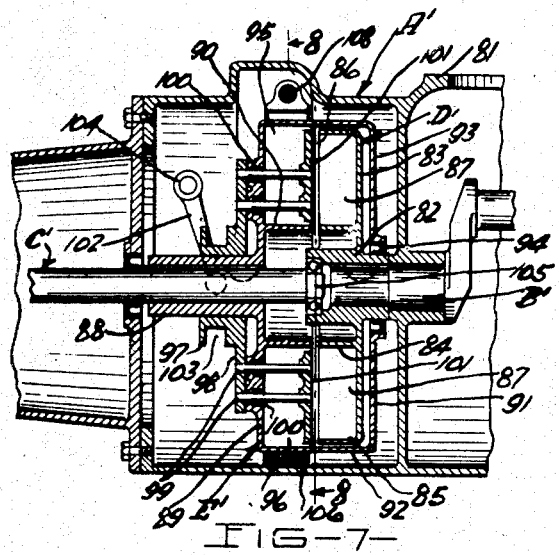
FIG-7-
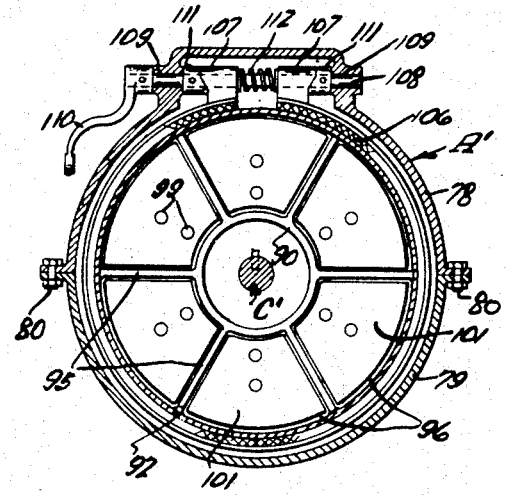
FIG-8-
INVENTOR
ADOLPH RONNING
BY Carlsen & Hagle
ATTORNEYS Patented Oct. 7, 1941

2,258,302

UNITED STATES PATENT OFFICE 2,258,302

HYDRAULIC CLUTCH

Adolph Ronning, Minneapolis, Minn.

Application March 13, 1939, Serial No. 261,507

5 Claims. (Cl. 60—54)

This invention relates to hydraulic clutches for power transmission between driving and driven shafts or other mechanical elements.

The primary object of the invention is to provide a clutch employing a fluid as the actual power transmission medium so that even and minute power ratios between driving and driven parts may be obtained and so that shocks and jars, due to clutch variations, will be damped out very effectively.

Another object is to provide a hydraulic clutch employing a driving member and driven member which are provided with facing pockets or cells for containing the fluid and having paddle-like effect on the fluid to transfer power between the two, and with means for increasing or decreasing the volume of the pockets in one member to thereby vary the effect thereon by the fluid actuated by the other member and secure an adjustable power transfer between the parts.

A further object is to provide novel and efficient means for varying the effective volume of the various pockets, and control mechanism, operable from a remote point exterior to the clutch, for actuating said means.

These and other more detailed and specific objects will be disclosed in the course of the following specification, reference being had to the accompanying drawings, in which—

Fig. 1 is a diametrical section through a hydraulic clutch, shown in released condition and constructed in accordance with my invention.

Fig. 2 is a cross section along the line 2—2 in Fig. 1.

Fig. 3 is a view similar to Fig. 1 but showing the pockets in the clutch member adjusted to maximum volume or fully engaged condition.

Fig. 4 is another diametrical section showing a clutch having an adjusting member of modified construction.

Fig. 5 is a cross section along the line 5—5 in Fig. 4.

Fig. 6 is a fragmentary sectional view of the clutch of Fig. 4, but showing a modified form of control mechanism for the adjusting member.

Fig. 7 is a diametrical sectional view through a combination clutch and brake assembly constructed in accordance with my invention.

Fig. 8 is a cross section along the line 8—8 in Fig. 7.

Referring now with more particularity to the drawings, the embodiment of my invention illustrated in Figs. 1 through 3 will be first described.

Essentially or basically the clutch embodies an outer housing or case A into which are coaxially journaled from opposite directions the driving shaft B and driven shaft C, and within which housing are rotatably arranged a driver or impeller clutch element D and runner, rotor, or driven clutch element E. The element D is connected to the driving shaft B to rotate therewith and this shaft is driven by any suitable power means (not shown). The clutch element E is connected to the driven shaft C to rotate therewith, and it will be evident that clutching action or power transmission between the clutch elements will result in rotation of the driven shaft under control of the driving shaft.

It may be noted at this point that the clutch is reversible, that is, either shaft B or C may act as the driving shaft without change in the operation of the clutch as a whole, and the terms "driving" and "driven" as specifically applied to certain parts in this description are accordingly used for convenience sake only.

Referring with more detail to the structure it will be noted that the housing A is made of two complementary sections 10 and 11, releasably secured together by bolts 12 through their marginal flanges 13, and which define a large interior chamber 14 in which the clutch elements D and E may freely rotate. Additionally the section 11 adjacent the driven element E is extended, in what may be termed the rearward direction, to provide space for operating mechanism later to be described, this rearward extension being designated at 15. A removable cover plate 16 allows convenient access to the interior of this rear portion of the housing to be obtained.

Centrally located on the ends of the housing sections 10 and 11 are the antifriction bearings 17 and 18 through which the shafts B and C are journaled and passed inwardly into the housing. Suitable oil seals 19 are provided at the outer ends of the bearings to prevent the escape of oil or fluid from the bearings and housing.

The driving clutch element D comprises a head or disk member 20 secured at its center at 21 to the flanged inner end of the driving shaft B, and marginally provided with a lip 22 by which it is secured to the lip 23 of the rear closure or drum member 24, bolts 25 being placed through these lips to draw them to a fluid tight seal. The central portion of the head member 20 is offset as at 26, forming an annular inner run or wall 27, and a concentrically located but outwardly spaced rim or band 28 is provided just within the member 24 in a rearwardly extended direction. Evenly spaced, rearwardly extended and radially directed vanes, fins, or paddles 29 extend between the rims 27 and 28 and thus define a series of segment-shaped cells or pockets 30 opening in a common plane at the rear face of this driving element.

The driven element E is similar to the head member 20 and comprises a disk member 31 offset at 32 centrally to provide an inner rim or wall 33, of the same diameter as the rim 27, and turned forwardly at its outer edge providing a rim or band 34 of the same diameter as the rim 28. A series of fins or paddles 35, of the same spacing and arrangement as the fins 29 divide the space between the rims 33 and 34 into an equal number of segment-shaped pockets or cells 36 opening forwardly and facing the pockets 30 of the driving element. Centrally the disk is secured at 37 on a flanged portion of the driving shaft so that the pocketed faces of the clutch elements may turn just clear of each other and in facing relation. The extremity of the driven shaft is journaled in a pilot bearing 38 in the end of the driving shaft B to turn freely therein.

The control mechanism comprises bearing collar or sleeve 39 which is slidably mounted upon the driven shaft C, rearwardly of the driven clutch element E, and which slidably and rotatably extends through an oil seal 40 in the rear center of the drum member, 24, of the driving clutch element. A wide radial flange 41 on this sleeve 39 extends outward rearwardly of the disk 31 and a plurality of carrier pins or fingers 42 are rigidly carried by this flange with their ends turned forwardly and slidably through openings 43 in the disk so that one pin enters each pocket 36 near its inner end. Segment shaped plates or baffle members 44, of such shape and size that they will freely and nicely fit into the pockets 36, are secured to the forward ends of the pins 42, and it will be understood that by shifting the sleeve 39 forwardly or rearwardly these plates will be correspondingly shifted in their pockets 36. As a result the effective volume or depth (rearwardly) of the pockets 36, relative to that of the pockets 30, may be varied at will.

Shifting action of the sleeve 39 may be accomplished by a fork 45 engaging a peripheral groove 46 in the rear portion of the sleeve and oscillatably supported by a transverse shaft 47 journaled in the housing. By rocking this shaft exteriorly of the housing the fork may be caused to move the sleeve and connected parts forwardly or rearwardly to the desired amount, as will be readily evident.

In operation the interior of the driving element D of the clutch is well filled with hydraulic fluid and so that the pockets in the clutch members will be filled. The driving element being then rotated by power connection to driving shaft B, the oil, by action of the fins 29 and of centrifugal force, is circulated as indicated by the arrows in Fig. 3 (depending on the direction of travel) between the various pockets 30 and 36. Assuming the pockets 36 in the driven element to be opened or exposed to full extent, as shown in Fig. 3, this oil moving in the pockets will cause a transfer of power between the driving and driven elements, setting the latter into operation. There is at no time, however, any mechanical connection between driving and driven parts, and a smooth and uniform transfer of power will thus be obtained.

To regulate the relative power transfer to the driven member E and to the driven shaft connected thereto, the fork 45 may be shifted forwardly, causing the plates 44 to decrease the effective volume or depth of the pockets 36, and the moving power exerted by the oil in these pockets will thus be correspondingly reduced. Fig. 1 shows this action carried forward to the point where the pockets 36 are entirely closed by the plates 44, and the power transfer at this point is obviously at a minimum. It will be apparent that minute changes in the drive ratio between the parts may thus be carried out.

The clutch shown in Figs. 4 and 5 is analogous to that just described and includes a housing A, driving shaft B, driven shaft C, driving clutch element D, and driven element E. The housing A is constructed in the same manner as the first described housing and has similar shaft supporting parts. Corresponding reference numerals are accordingly employed.

The driving element D has a head disk 48 formed with concentric, rearwardly turned, and radially spaced rims or bands 49 and 50 which are joined by spaced, rearwardly, and radially disposed vanes 51 defining segment-shaped and rearwardly opening pockets 52. This head disk is secured at 53 on the drive shaft B and is closed marginally by a detachable rear drum or cover 54 having a fluid tight fit at 55 around the periphery of the disk.

The driven element E is in this case of entirely different construction and comprises a shallow disk or drum-like member 56 secured centrally at 57 to the driven shaft, and provided with a marginal forwardly turned rim or band 58 of the same diameter as, and arranged in facing relation to, the rim 50. This member 56 has a series of radially extended and forwardly turned vanes, fins, or paddles 59 which define therebetween the forwardly opening pockets or cells 60 corresponding in size and number to the pockets in the driving element D. However, the inner ends of these pockets are defined and formed by an annular inner rim or band 61 which in this case is carried upon a disk-like adjusting member 62, the outer portion of which is radially slotted at 63 to clear the vanes 59 and to provide segment-shaped baffle elements or plates 64 corresponding in function to the hereinbefore described plates 44.

This adjusting member 62 is secured at 65 upon the inner flanged end of a short operating rod 66 slidably mounted in an axially extended and forwardly opening bore 67 formed in the driven shaft C. Rearwardly of the drum 54 the rod 66 has a diametrically extended pin 68 which extends slidably through longitudinal slots 69 in the shaft C and is secured in a ring 70 slidably mounted with respect to the shaft. The shifting fork 71, arranged exactly as heretofore described, is pivotally connected to a band 72 journaled on the ring 70, and by manipulating this fork the rod 66 may obviously be shifted or reciprocated axially within the driven shaft C to vary the position of the plates 64 in the pockets 60. The oil seal 73, between the drum 54 and the driven shaft C, is thus relieved of wear due to adjustment of the clutch, and such as would occur in the structure of Figs. 1 to 3.

The rim 61, it will be noted, will slip freely over, or telescope on, the rim 49 of the driving clutch element D as the adjusting member moves forwardly, to thus give clearance for such movement and substantially prevent the escape of oil from the pockets. The inner ends of the vanes 51 are notched as shown in Fig. 4, in order to clear the rim 61 in this operation.

The operation of this form of clutch is similar to that previously described, and shifting of the member 62 will obviously vary the effective working volume of the pockets in the one clutch member to vary the clutch effect correspondingly.

In the assembly shown in Fig. 6, the clutch per se, is exactly like that of Figs. 4 and 5, but in this case the entire driven shaft C is tubular so that the operating rod 66 may be extended outwardly through the exposed shaft end for direct reciprocation by a hand lever 74. This lever is pivotally connected to the clutch housing by the link 75 and has a ball and socket connection at 76 with the end of the rod. The power takeoff (or drive) for shaft C is then obtained through a pulley 77, as shown.

Figs. 7 and 8 illustrate a combined hydraulic clutch and friction brake unit. This modification, particularly suitable for power transmission motor vehicles, is described, but not claimed, in my co-pending application Serial No. 259,361, filed March 2, 1939, for Motorcycle, and reference is invited to this disclosure for an exemplification of the uses to which such devices may be put.

In this assembly the housing A', driving shaft (or crankshaft) B', driven shaft (or propeller shaft) C', and driving and driven clutch elements D'—E', correspond in function to those previously described. However, the housing in this case may be split or parted at diametrically opposed points into upper and lower sections 78—79 secured together by bolts 80, and the housing may well be a part of the crankcase 81 where the assembly is used in connection with an engine (not shown).

The driving clutch element D' includes a central hub 82 by which it is secured upon the inner end of the drive shaft B', and the disk portion 83 surrounding this hub is provided with concentric, rearwardly turned inner and outer rims 84—85 which are joined by radial fins or vanes 86 to define a series of segment-shaped, rearwardly opening pockets or cells 87.

The driven clutch element E' comprises a long hub portion 88 secured on the driven shaft C' and with a surrounding disk portion 89 provided with an inner annular rim 90. A drum or cover member 91 is secured to or carried by the disk 89 with a wide rim member 92 and forward closure member 93 which enclose the element D' and form a sealed fluid chamber. An oil seal 94 runs on the hub 82 to complete the sealing function of the drum. Radially extended and forwardly turned fins or blades 95, outwardly of the rim 90, define a series of forwardly opening pockets or cells 96. The driven shaft C' has a pilot bearing at 105 in the hub 82.

An adjusting mechanism is provided and comprises a sliding sleeve bearing 97 slidable on the hub 88 and with a radial flange 98 which carries a series of pins or fingers 99 extended forwardly and slidably through openings 100 in the disk 89 into the pockets 96. Plates or baffle members 101 are secured to these pins and are of such shape and size that they will move freely in the pockets to increase or decrease the depth or volume thereof as they are shifted in a fore and aft direction. This shifting action is provided by a fork 102 engaging a peripheral groove 103 in the sleeve 97 and rocked by a shaft 104 permitting control from outside of the housing.

The clutch thus functions in the same manner as that shown in Figs. 1–3, and the control mechanism is obviously similar in construction and function.

The cylindrical surface of the closure member 91 of the driven clutch element will serve very effectively as a brake drum, and a friction brake band 106 is accordingly provided around this drum. The ends of the band carry the usual cam surface end blocks 107 by which they are supported on the operating shaft 108. This shaft is journaled through the housing as indicated at 109, and may be rocked on its axis by an exterior lever 110 so that the cam blocks 111 urge the ends of the band together and constrict the band into braking engagement with the drum. The driven shaft C' may thus be braked at any time. Normally the brake band is expanded clear of the drum by the spring 112.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A hydraulic clutch comprising a pair of independently rotatable clutch elements supported in face to face relation, the said clutch elements having fluid handling pockets opening only through their adjacent faces, an adjusting member slidably supported adjacent one clutch element and rotatable therewith, plates adjustably mounted in the pockets in this clutch element, connecting means extending between the adjusting member and the plates and slidably entering the said pockets, and means for shifting the said adjusting member with respect to the clutch element for adjusting the plates toward or away from the open sides of the pockets and thereby varying the fluid handling capacity thereof.

2. A hydraulic clutch comprising a pair of independently rotatable clutch elements supported in face to face relation, the said clutch elements having fluid handling pockets opening only through their adjacent faces, an adjusting member slidably supported on one clutch element and rotatable therewith, fingers extending from this member slidably into the pockets in the clutch element, plates secured to the said fingers and arranged in the pockets, the said pockets and plates being of the same shape, a fork connected to the adjusting member, and means for actuating the fork to shift the said member with respect to the clutch element and adjust the plates toward and away from the open sides of the pockets in said clutch element.

3. A hydraulic clutch comprising a pair of clutch elements having fluid pockets, plate members mounted in the pockets of one clutch element and movable therein for varying the volumetric capacity of the pockets, carrier members extending into said pockets and supporting the plate members therein, and means for adjusting the carrier members to move the plate members in the pockets.

4. A hydraulic clutch comprising a pair of clutch elements having fluid pockets, plate members mounted in the pockets of one clutch element and movable therein for varying the volumetric capacity of the pockets, carrier pins movably mounted through one clutch element and extending into the pockets therein, the said carrier pins within the pockets being connected to the plate members to support same in the pockets, and means arranged exteriorly of the pockets connecting all of the carrier pins for adjusting them in unison and thereby moving said plate members in the pockets.

5. In a hydraulic clutch, a pair of clutch elements having fluid pockets, one of said clutch elements having a disk portion and radial vanes for defining margins of the pockets, the said disk portion having an opening registering with each pocket, pins slidably mounted through the openings, segment-shaped plates secured to one end of the pins and supported thereby in the pockets into which said pins enter, and means connecting the other ends of the pins for moving them through the said openings and adjusting the plates in the pockets.

ADOLPH RONNING.